US008949879B2

(12) United States Patent
Zipperer et al.

(10) Patent No.: US 8,949,879 B2
(45) Date of Patent: Feb. 3, 2015

(54) ACCESS CONTROLS FOR KNOWN CONTENT

(75) Inventors: Joseph Zipperer, Seattle, WA (US);
Steven King, Bellevue, WA (US);
Valiant Seu, Bellevue, WA (US)

(73) Assignee: Media IP, LLC, Seattle, WA (US)

( * ) Notice: Subject to any disclaimer, the term of this patent is extended or adjusted under 35 U.S.C. 154(b) by 0 days.

(21) Appl. No.: 13/451,510

(22) Filed: Apr. 19, 2012

(65) Prior Publication Data

US 2012/0315019 A1 Dec. 13, 2012

Related U.S. Application Data

(60) Provisional application No. 61/478,204, filed on Apr. 22, 2011.

(51) Int. Cl.
| H04N 7/16 | (2011.01) |
| G11B 27/32 | (2006.01) |
| G06F 21/10 | (2013.01) |
| H04N 5/76 | (2006.01) |
| G11B 20/00 | (2006.01) |

(52) U.S. Cl.
CPC ............ *G11B 27/322* (2013.01); *G06F 21/10* (2013.01); *H04N 5/76* (2013.01); *G11B 20/00152* (2013.01); *G11B 20/00159* (2013.01)
USPC .................. 725/28; 725/25; 725/27; 725/30; 386/261; 713/168; 713/182; 713/184; 713/186

(58) Field of Classification Search
USPC ......... 713/150–155, 168, 176, 180, 182–186, 713/189; 380/251, 270; 463/29; 386/261; 725/25–28, 30
See application file for complete search history.

(56) References Cited

U.S. PATENT DOCUMENTS

| 6,697,944 B1 | 2/2004 | Jones et al. |
| 6,859,791 B1 | 2/2005 | Spagna et al. |
| 7,124,938 B1 * | 10/2006 | Marsh ........................... 235/382 |
| 7,360,088 B2 | 4/2008 | Mishina et al. |
| 7,505,584 B2 | 3/2009 | Kamibayashi et al. |
| 7,779,064 B2 | 8/2010 | Phillips |
| 7,809,888 B1 | 10/2010 | Clark et al. |
| 7,844,831 B2 | 11/2010 | Benhammou et al. |
| RE42,019 E | 12/2010 | Tagawa et al. |
| 7,930,762 B1 * | 4/2011 | Blair et al. ....................... 726/28 |
| 8,306,918 B2 | 11/2012 | Farrugia et al. |
| 8,312,294 B2 | 11/2012 | Sato et al. |
| 8,312,484 B1 * | 11/2012 | McCarty et al. ................ 725/28 |
| 2002/0095673 A1 * | 7/2002 | Leung et al. .................... 725/25 |
| 2002/0126841 A1 | 9/2002 | Arai |
| 2003/0220835 A1 | 11/2003 | Barnes, Jr. |

(Continued)

OTHER PUBLICATIONS

Young; International Search Report for PCT/US07/22007; mailed May 5, 2008; 1 page.

(Continued)

*Primary Examiner* — Hung Dang
*Assistant Examiner* — Mishawn Dunn
(74) *Attorney, Agent, or Firm* — Lowe Graham Jones PLLC; Ellen M. Bierman

(57) ABSTRACT

Personalized access controls associated with digital media are provided. The system records access controls associated with specific digital media assets in a digital library and creates policy decisions regarding use of the asset based on these settings. Data management for the access controls is also specified, including on an individual and group basis.

19 Claims, 5 Drawing Sheets

(56) References Cited

U.S. PATENT DOCUMENTS

| | | |
|---|---|---|
| 2004/0006690 A1 | 1/2004 | Du et al. |
| 2004/0010601 A1* | 1/2004 | Afergan et al. ............... 709/229 |
| 2004/0244030 A1* | 12/2004 | Boyce et al. ................... 725/25 |
| 2004/0254940 A1 | 12/2004 | Brush |
| 2005/0025465 A1 | 2/2005 | Danieli |
| 2005/0044280 A1 | 2/2005 | Reisman |
| 2005/0190782 A1 | 9/2005 | Buckley et al. |
| 2006/0156355 A1 | 7/2006 | Kawasaki et al. |
| 2006/0171672 A1* | 8/2006 | Jin et al. ........................ 386/94 |
| 2006/0200415 A1 | 9/2006 | Lu |
| 2006/0224519 A1 | 10/2006 | Ahn |
| 2006/0239650 A1 | 10/2006 | Heredia et al. |
| 2007/0033344 A1 | 2/2007 | Tanaka |
| 2007/0192634 A1 | 8/2007 | Cheon et al. |
| 2007/0219921 A1* | 9/2007 | Lee et al. ...................... 705/59 |
| 2007/0234341 A1 | 10/2007 | Chang et al. |
| 2008/0075437 A1 | 3/2008 | Hamada et al. |
| 2008/0098239 A1 | 4/2008 | Wada et al. |
| 2008/0133546 A1 | 6/2008 | Phillips |
| 2008/0162925 A1* | 7/2008 | Okaya ........................... 713/155 |
| 2008/0176540 A1 | 7/2008 | Khedouri et al. |
| 2008/0205291 A1 | 8/2008 | Li et al. |
| 2008/0228300 A1 | 9/2008 | Tagawa et al. |
| 2008/0270796 A1 | 10/2008 | Suu et al. |
| 2008/0271154 A1 | 10/2008 | Kamada et al. |
| 2008/0307339 A1* | 12/2008 | Boro et al. .................... 715/764 |
| 2009/0052870 A1* | 2/2009 | Marsh et al. .................. 386/124 |
| 2009/0086978 A1 | 4/2009 | McAvoy et al. |
| 2009/0150487 A1* | 6/2009 | Wolfish et al. ................ 709/203 |
| 2009/0164709 A1 | 6/2009 | Lee et al. |
| 2009/0282454 A1 | 11/2009 | Ekstrand |
| 2009/0313432 A1 | 12/2009 | Spence et al. |
| 2010/0023689 A1 | 1/2010 | Kim |
| 2010/0127013 A1 | 5/2010 | Butler |
| 2010/0262912 A1 | 10/2010 | Cha |
| 2010/0280953 A1 | 11/2010 | Kitazato |
| 2010/0287584 A1* | 11/2010 | Starikov et al. ................ 725/28 |
| 2010/0287609 A1 | 11/2010 | Gonzalez et al. |
| 2010/0293581 A1 | 11/2010 | Robert |
| 2010/0297933 A1 | 11/2010 | Sim |
| 2011/0009051 A1 | 1/2011 | Khedouri et al. |
| 2011/0078722 A1 | 3/2011 | Wendling |
| 2011/0091187 A1 | 4/2011 | Duffin et al. |
| 2011/0093622 A1 | 4/2011 | Hahn et al. |
| 2011/0197131 A1 | 8/2011 | Duffin et al. |
| 2011/0225417 A1* | 9/2011 | Maharajh et al. .............. 713/150 |
| 2011/0289137 A1 | 11/2011 | Ittah et al. |
| 2012/0072713 A1 | 3/2012 | Begum et al. |
| 2012/0117585 A1* | 5/2012 | Curtis et al. .................... 725/25 |
| 2012/0124390 A1 | 5/2012 | Zipperer et al. |
| 2012/0137135 A1 | 5/2012 | Kasahara et al. |
| 2012/0216222 A1* | 8/2012 | Candelore ...................... 725/28 |
| 2012/0233447 A1 | 9/2012 | Fitzgerald |
| 2012/0254629 A1 | 10/2012 | Zipperer et al. |
| 2012/0272065 A1 | 10/2012 | Matsukawa et al. |
| 2012/0324244 A1 | 12/2012 | Zipperer et al. |

OTHER PUBLICATIONS

Android SDK, available for download at http://www.netmite.com/android/mydroid/1.6/out/target/common/docs/offline-sdk/guide/developing/tools/othertools.html#mksdcard, downloaded Jun. 16, 2013.

Guofei, et al. "PLI: A New Framework to Protect Digital Content for P2P Networks," Year 2003; Microsoft Research Asia, Beijing 100080, China; pp. 1-12.

* cited by examiner

ACCESS CONTROLS FOR KNOWN CONTENT

CROSS-REFERENCE TO RELATED APPLICATIONS

This application claims the benefit of U.S. Provisional Application No. 61/478,204, filed Apr. 22, 2011, which is incorporated by reference in its entirety.

TECHNICAL FIELD

The disclosure generally relates to the field of video playback devices, and more particularly, those devices that play content from a digital library stored either locally or remotely.

BACKGROUND

V-chip technology was mandated pursuant to the Telecommunications Act of 1996. Since January 2000, all televisions produced for sale in the United States have been required to implement this technology. The intention of such legislation and technology is to provide parents control over the programs that their children watch on television through broadcast, cable, or satellite television. V-chip within playback devices (such as a television) use ratings contained within the television broadcast. The ratings are a form of metadata about the television program.

Multiple organizations create the ratings used by the V-chip according to different standards. The Motion Picture Association of America (MPAA) rates theatrical movies according to its standards. TV producers and TV networks rate their own programs according to the TV ratings descriptions. Some ratings from different organizations may seem similar (TV-PG and MPAA PG), but are different as each use a different standard from a different organization. TV ratings, unlike MPAA ratings, may also contain labels (D, L, S, V, FV) showing contributing factors to the rating. MPAA may have such classifications in print or movie trailer, but carry no equivalent content labels during broadcast transmission. Premium cable companies, such as HBO and Showtime, may augment MPAA ratings with content labels in their program guides to help parents understand why the specific rating was used. However, this information is not available in the television program for use by the V-chip. Many televisions sold within the US, also support TV programs rated according to Canadian Broadcasting Codes. Instead of content labels used with US TV ratings, disclaimers are aired at the beginning of the program. An understanding of all rating systems is required in order to properly configuration the V-chip since the rating system used for each program may not be known before the program is received.

The V-chip enforcement system (television rating included within the television program) is predicated on a television program rating and rating policy configuration. The consumer configures rating policies for each V-chip enabled television. Both items (television rating and configuration) must be available prior to receiving the television program. The V-chip uses the program rating and rating policy configuration to determine if the program is allowed or blocked. In the event that a program is blocked, a parent may input a PIN code allowing the program to be viewed without changing the policy configuration.

Since V-chip technology was mandated and introduced, video entertainment has begun a fundamental shift. In addition to terrestrial broadcast, cable, and satellite, digital distribution of video (streaming) has also been introduced and increasing in market share. Unlike broadcast technologies (terrestrial, cable, satellite) where the same programming is delivered to all TV sets, different programming is delivered to individual televisions or viewing screens using the Internet or other network.

Various companies utilize video streaming technology through software included in televisions, or devices attached to televisions allowing streamed content to be viewed on televisions. Such devices include PVR (personal video recorder), DVD or Blu-ray player, game console, or cable box. In addition to one-time-views, consumers are also allowed to purchase a digital program for repeated viewing. The consumer's purchase history is stored and using the stored digital files, a digital library is created allowing the consumer to watch the program multiple times at their convenience, outside of a scheduled broadcast. Cable networks offer similar functionality replacing the Internet with their private cable networks and terming the product "on-demand".

The shift to digital libraries affects not only when consumers watch video programs, but where parental controls need to be enforced, who watches the content, and how content is rated. With the advent of digital libraries, video content can be viewed on a variety of devices beyond the television. Such devices include, for example, mobile phones, laptop or notebook computers, eBook readers, tablets, or desktop computers. Many US households have multiple of such devices, likely from different manufactures. Although content can be viewed on many devices, there is no mechanism to transfer ratings policies between devices. As the families' attitude change and children mature, this need is ever more apparent.

A digital library typically contains content for a single household, not a single individual. Since digital libraries contain content for multiple individuals, multiple policies are required to control the content for individuals. Many households have children in different age groups. Conventionally, a single override exists only for the parent. With multiple age groups, the single override available using V-chip technology is insufficient; the most restrictive rating policy must be implemented. For example, cartoons (TV-Y7 and greater) may be objectionable for the youngest viewer in the household, but there is an older child in the household that may watch the program. With the override behavior of a single PIN number, programs rated TV-Y7 and above must be blocked, even for the older child. Giving the older child the PIN number will unlock all ratings, including any the parents consider objectionable for the older child.

Ratings provide an independent assessment prior to content viewing so that the parent does not need to view a programming prior to their child. The rating is an indication of the material contained within a program that may be considered objectionable. When a program has been viewed before, the assigned rating may not coincide with the parent's judgments. The program may contain objectionable material in the parent's eye, or may lack such objectionable material. Once the program's content is known, such as with a digital library, if the parent chooses to persistently override the original rating, it should be possible so that a parent is not required to enter a PIN in order for the child to view the program.

DETAILED DESCRIPTION

The figures and the following description relate to example embodiments by way of illustration only. It should be noted that from the following discussion, alternative embodiments of the structures, techniques, and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict example embodiments of the disclosed system (or method) for purposes of illustration only. One skilled in the art will readily recognize from the following description that alternative embodiments of the structures, techniques, and methods illustrated herein may be employed without departing from the principles described herein.

Configuration Overview

One example embodiment of a disclosed system (or method and computer readable storage medium) that implements the access controls is described.

Computing Machine Architecture

Figure 1:
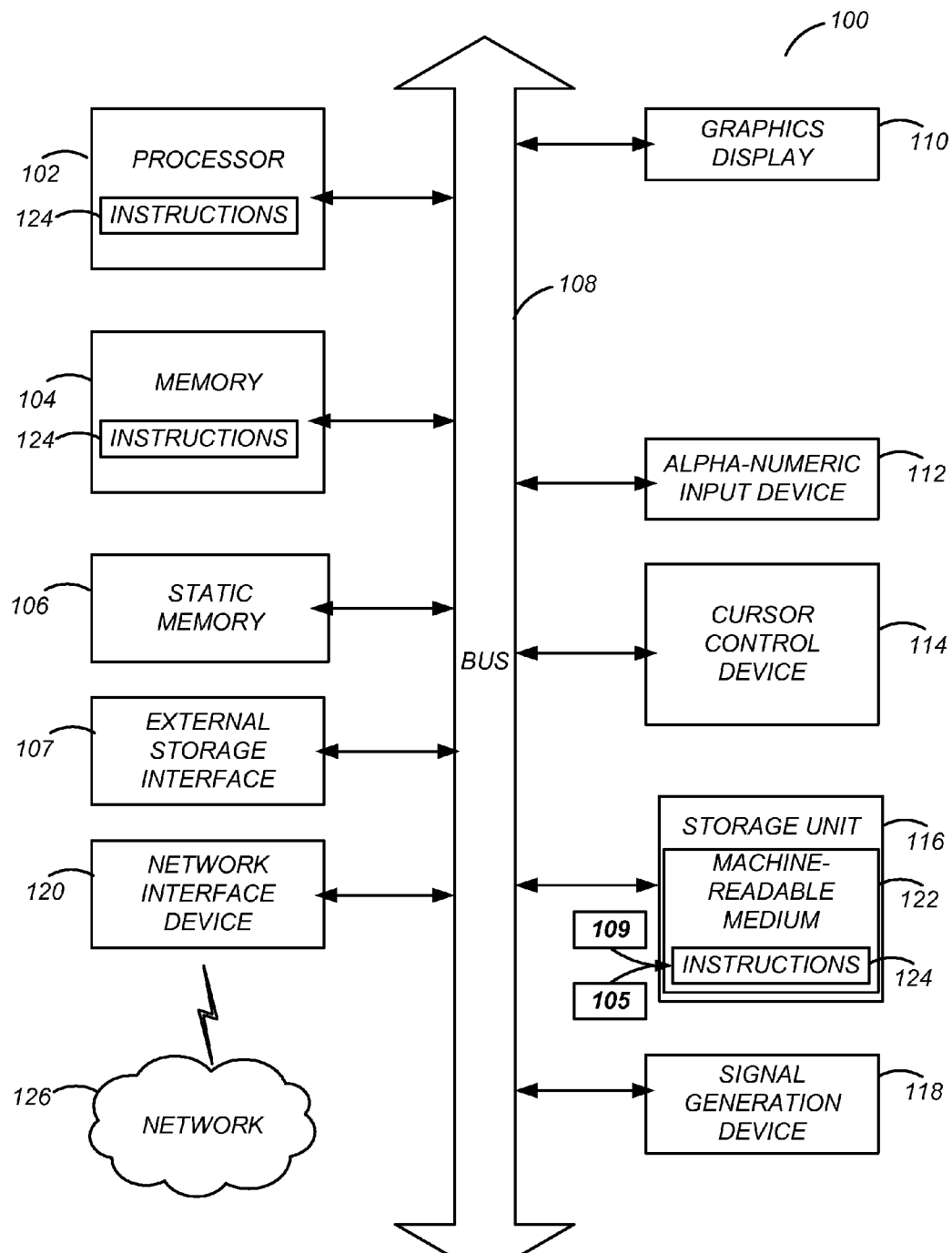
FIG. 1 illustrates one example embodiment of components of an example machine able to read instructions from a machine-readable medium and execute them in a processor (or controller).

FIG. 1 is a block diagram illustrating components of an example machine able to read instructions from a machine-readable medium and execute them in a processor (or microcontroller). Specifically, FIG. 1 shows a diagrammatic representation of a machine in the example form of a computing system 100 within which instructions 124 (e.g., software) for causing the machine to perform any one or more of the methodologies discussed herein may be executed. In some example embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a tablet PC, eBook reader, a network router, switch or bridge, a gaming console, a DVD or Blu-ray Disc player, television, PVR, or any machine capable of executing instructions 124 (sequential or otherwise) that specify actions to be taken by that machine. In addition, the machine may be configured to include instructions configured as firmware. Further, while only a single machine is illustrated, the term "machine" shall also be taken to include any collection of machines (or apparatuses) that individually or jointly execute instructions 124 to perform any one or more of the methodologies discussed herein.

The example computing system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computing system 100 may further include graphics display unit 110 (e.g., a plasma display panel (PDP), a liquid crystal display (LCD), a projector, or a cathode ray tube (CRT)). The computing system 100 may also include alphanumeric input device 112 (e.g., a keyboard, remote control), a cursor control device 114 (e.g., a mouse, a trackball, a joystick, a motion sensor, touch sensor, touch screen, or other pointing instrument), a persistent storage unit 116, a signal generation device 118 (e.g., a speaker), and a network interface device 120, which also are configured to communicate via the bus 108.

The storage unit 116 includes a machine-readable medium 122 on which are stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computing system 100, the main memory 104 and the processor 102 also constituting machine-readable media. The instructions 124 (e.g., software) may be transmitted or received over a network 126 via the network interface device 120.

Also included in the computing system 100 is an external storage interface 107. The external storage interface 107 provides the ability to transfer data into and out of the computer system. Either machine readable or human readable information may be transferred. These data transfers may include software/firmware updates, configuration data, or media. The external storage interface 107 in one embodiment may be a physical device that accepts SD card in various physical formats (SD card, mini SD, or micro SD) and interfaces the electrical characteristics such that the storage on the SD card can be accessed by the computing device. In another embodiment, the external storage interface may also be used for adapters such as a USB-SD card reader, PC card-card reader, express card reader, USB flash drive, eSata, or any other electrical interface such that the computing device 100 can communicate with a storage device. The network interface device 120 can also serve as an external storage interface While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Machine-readable medium 122 also may include tangible, non-transitory storage mediums. The instructions stored thereon may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames).

In one example embodiment, the instructions 124 correspond to an application program 105. The application program 105 includes a set of machine-readable instructions to carry out key exchange and data transfer specifications as further described herein.

Consumer Ratings and Policy Elements

Figure 2:
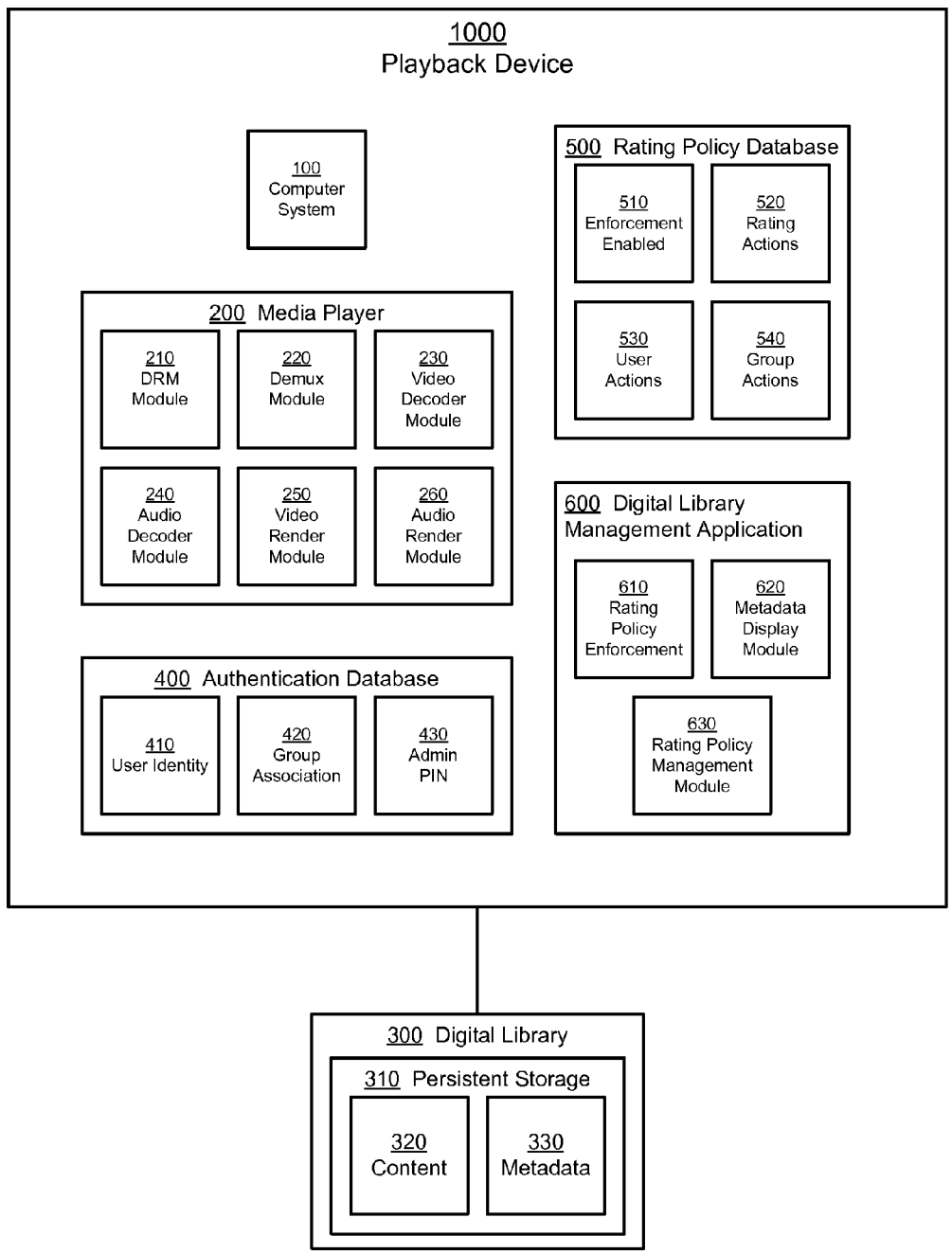
FIG. 2 illustrates one example embodiment of a computing configuration for use with digital library ratings enforcement.

FIG. 2 illustrates one example embodiment of a computing configuration for use with a digital library. The computing environment includes a computing system 100, a media player application 200, a digital library 300, an authentication database 400, and a rating policy database 500, and a digital library management application 600, The media player application 200 decodes and renders the content for the consumer. The media player application 200 is further composed of a DRM module 210, a demux module 220, a video decoder module 230, an audio decoder module 240, a video render module 250, and an audio render module 260. The DRM module 210 processes any digital rights management (DRM) information associated with the media. Commercial content may use DRM to provide anti-piracy protection for content. After any DRM has been processed, the demux module 220 splits the content into separate streams, typically audio and video streams. Once the content has been separated into streams, the audio decoder module 240 decodes the audio stream. The video decoder module 230 decodes the video stream. Finally, the audio render module 260 and the video render module 250 convert the respective streams so that content can be heard and seen by the consumer, thus interpreted by one or more of the five human senses.

The digital library 300 stores content. The digital library 300 is composed of persistent storage 310, content 320, and metadata 330. The persistent storage 310 holds the content 320 and metadata 330.

The content 320 may take many forms, such as video (movies, music videos, TV shows), audio (music, audio books, podcasts), text (eBooks), and video games. Additional forms of digital content may also be stored, so long as the playback device 1000 contains an application that can decode and render the content. A unique content identifier is used to identify content 320. Content 320 may optionally be protected with DRM.

Metadata 330 describes properties about the content 320. The metadata 330 is such information used to select the content, such as text (e.g., title, description, actors, directors, products, etc.), pictures (e.g., box cover art, chapter title, etc.), video (e.g., movie trailer, preview, snippet, etc.), content rating, content rating qualifiers, content rating system, and/or audio (music track preview) representing the content. Rating systems exists in various forms for most content types including movies, TV shows, video games, music videos, and so on. Some content rating systems also use content rating qualifiers to further extend the definition of any specific rating. Rating systems vary according to region, country, and other factors so they are not exhaustively enumerated here. Example rating systems are MPAA and EIRIN. Although metadata 330 is shown separate from content 320, the two may be combined in some embodiments.

In order to access the content 320, the digital library 300 is coupled to the playback device 1000 either though the external storage interface 107, as a case when the digital library 300 exists on a device (hard disk drive, flash or optical media), or through the network interface device 120 when the content is accessible over a network (LAN, WAN, Internet cloud). Due to the nature of cloud computing and network access, consumers may access either their own personal digital library 300 or one owned or populated by another party. In other embodiments, the digital library 300 may be contained within the playback device 1000.

The authentication database 400 stores identity verification information. The authentication database 400 is comprised of user identity 410, groups association 420, and administration PIN 430. The authentication database 400 should be stored in a secure location or using techniques to prevent tampering.

User identity 410 contains user authenticators (e.g., PINs), The authentication database 400 will verify that no two user identifies are identical. Unlike traditional methods where a user identifier and authenticator (e.g., PIN) are required, only an authenticator is used for multiple reasons. First, there are a limited number of users. Second, the input mechanism for the playback device is limited to a numeric keypad on a remote control. Third, the playback device 1000 can authenticate users faster by eliminating another piece of required information.

Current authentication best practices dictate that at least two of three components of something the "user has", something the "user knows", and something the "users is" be satisfied. For this application, something the "user has" maps to the playback device. Something the "user knows" maps to the PIN. Something the "user is" typically maps to a biometric device. Thus the PIN only methods can be used in accordance with current best practices, even though user identifiers are eliminated.

Groups associations 420 contain sets of users. Groups associations 420 allow the administrator to apply the same policies to media for multiple individuals, reducing the number of configuration actions required. A group association is defined as containing one or more users.

Administration PIN 430 contains the administrator's authenticator. The administrator's authenticator controls access for the authentication database 400, authorization database 500, and digital library management application 600.

Additionally, an identifier tag can be associated with the PIN in order to facilitate the administration of the authentication database 400 provide a simpler association in subsequent steps. If identifier tags are used, user identity 410 also contains the between the associations between user identifiers and identify verification information. For example, PIN 1234 may be assigned to George. Rather than displaying PIN 1234 for all verification steps, the tag George can be associated with the PIN and George displayed instead. This has the added benefit that PINS are not visible during provisioning or policy generation.

Alternate to PINS, the authentication database 400 may use a different authenticator, such as a passphrase or use of a biometric device. The biometric device is an authentication mechanism whereby a person's identity is verified through physical means instead of the PIN knowledge. The biometric device may reside on a remote control unit, the display device, or the device decoding the content such as a set top box, DVD player, Blu-ray player, or game console.

The rating policy database 500 stores content rating override actions and metadata display actions configured by the parent. The rating policy database 500 is composed of enforcement enabled 510, rating actions 520, user actions 530, and group actions 540.

Enforcement enabled 510 is the master switch for all actions; it must be enabled prior to any content override actions. Any implementation (e.g., Boolean logic in software, hardware, or firmware) may be used.

Rating actions 520 control the display of metadata at content selection time. Rating actions 520 are configured policy actions based on the content rating system, content rating, and any content qualifiers used by the content rating system.

Deviations from rating actions 520 are stored within either user actions 530 or group actions 540.

User actions 530 are content playback actions where the stored rating is different than was set by the rating body. User actions 530 consist of mappings between the user identifier, content identifiers, content rating system, and new content rating. For example, consider a movie with the MPAA PG-13 and a V-chip setting to block movies rated PG-13 or higher. The user actions 530 may contain two override actions each allowing two different users to view the movie.

Group actions 540 are content playback actions where the stored rating is different than was set by the rating body. Group actions 530 consist of mappings between the user identifier, content identifiers, content rating system, and new content rating. For example, consider TV show T, rated TV-MA by the MPAA rating system and a V-Chip setting to block movies rated R or higher. The parent would like movie A should be allowed for users X, Y, and Z assigned to group G to watch. Therefore the mapping stored is TV show T, rating TV-PG, group G. This group action will allow any member of group G to watch the movie.

The external storage interface 107 and network interface device 120 allow the rating policy database 500 to be stored external to the playback device 1000, as well as imported from or exported to another compatible device. The rating policy database 500 should be stored in a secure location or using methods to prevent tampering. Of note, the rating policy database 500 and/or the authentication database 400 may be stored as any kind of data repository or equivalent.

The digital library management application 600 is composed of a rating policy enforcement module 610, a metadata display module 620, and a rating policy management module 630.

The rating policy enforcement module 610 determines if a rating action exists that overrides the V-chip blocking action based solely on the original content rating. The module uses the authentication database 400 and the rating policy database 500 to determine if the user is able to watch the content based on the rating actions 520, user actions 530, and group actions 540. The module also determines if metadata 330 should be displayed in order to enable media selection prior to rendering. The rating policy enforcement module 610 may enforce policy prior to the media player 200 decode or render operations, depending on specific implementation constraints.

The metadata display module 620 displays metadata, such as media title, media description, and/or pictures representing the media. Displaying such information allows the user to select content to be played by the media player application 200 from the digital library 300. The metadata display module 620 uses the rating policy enforcement module 610 to determine if the metadata can be displayed, thus controlling the content that can be played by the media player. Once the consumer chooses the content 320 from the digital library 300, the media player application 200 plays the content.

The rating policy management module 630 allows the user to modify (e.g., create, update, and/or delete) data stored in the digital library 300, authentication database 400, and rating policy database 500. In some embodiments, functions provided by the digital library management application 600 may be contained within the media player 200.

Ratings Generation and Configuration

Figure 3:
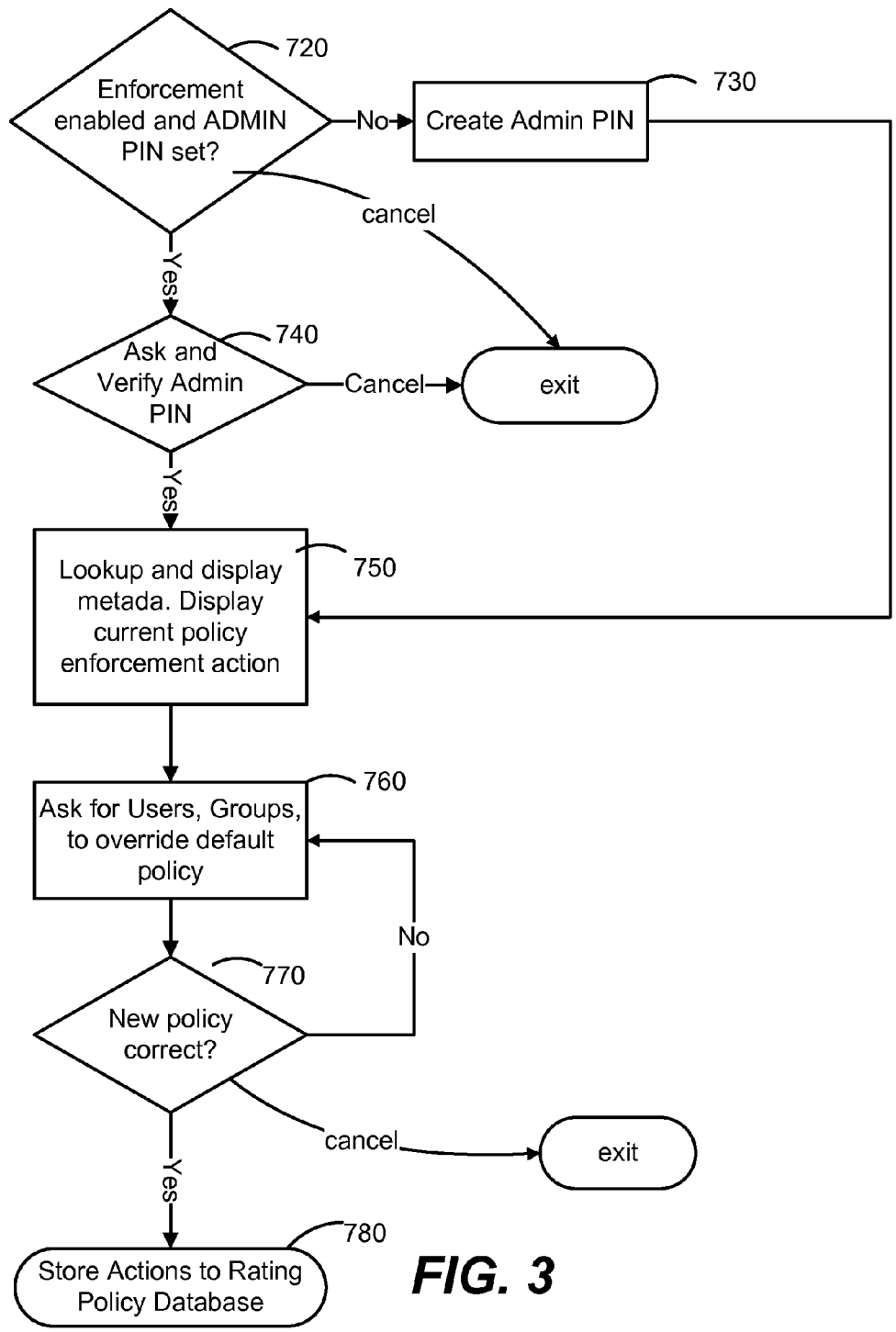
FIG. 3 illustrates one example embodiment of a process for generating an enforcement policy.

FIG. 3 illustrates creating a new rating policy to be enforced, in accordance with an example embodiment. The process begins when the user decides a specific rating is not appropriate and that content playability should be opposite the existing policy. Step 720 verifies that the enforcement enabled switch 510 is set and the admin PIN 430 is created. If the admin PIN 430 has not been set, a new admin PIN 430 is created and verified in step 730. The verification may use double-entry PIN as in traditional methods or any other form of known verification. In addition to keeping a separate admin PIN 430, the V-chip PIN can also be used. This reduces the number of PINs that a consumer needs to remember. If the consumer reaches this step in error, the process can be cancelled and abandoned.

If the enforcement enabled switch 510 was set and the admin PIN 430 set, the process continues in step 740 with verification of the existing admin PIN. Once the admin PIN is verified, either in step 730 or step 740, the content's current rating and policy enforcement is displayed in step 750. The policy enforcement may be to allow or to deny based on the current settings and existing policies. This may be a combination of the V-chip based settings and any policies contained in the rating policy database 510. If there is no existing policy, only the V-chip setting is used.

After the policy is displayed, override behaviors are added to the rating policy database 510 by requesting the user actions 520 and group actions 530 that can override the behavior in step 760. Actions may be added or removed depending on how the step was entered. Multiple actions (user actions 520 and group actions 530) can be added depending on the changes desired.

Optionally, step 770 continues the process to verify the actions correct and the desired behavior is achieved. To do so, the final disposition (allow or block) may be displayed in order to verify correctness. If the information is not correct, the process returns to step 760 for modification. If correct, the process completes with step 780 storing the new or changed information into the rating policy database 510. If information was removed, then the database is modified accordingly. Although not shown at every step, the process can be cancelled and abandoned at any time after step 740 without modifying the rating policy database 510.

This process can be started prior to or during content use. Alternatively, the process can be started when the content is acquired, or transferred into the digital library 300. The time at which the process starts is at the discretion of the digital library management application 600 implementer and may be based on such factors as user interface ("UI") standards or practices, prevailing wisdom, or other corporate, regulatory, or legal factors. Alternatively, the process can be implemented within the media player application 200.

Ratings are a form of metadata defining a specific property of digital content. In addition to ratings, other metadata can be used to control the policy engine. For example, content producer or genre can also be used instead of the content rating.

The V-chip policy can be considered a default action. Where rating systems exist, but are not defined for use with the V-chip (e.g., video game ratings), a different default action can be configured in place of the V-chip policy for additional rating systems. With this configuration, the system and techniques can be used for additional content types such as video games and eBooks.

Ratings Policy Enforcement

Figure 4:
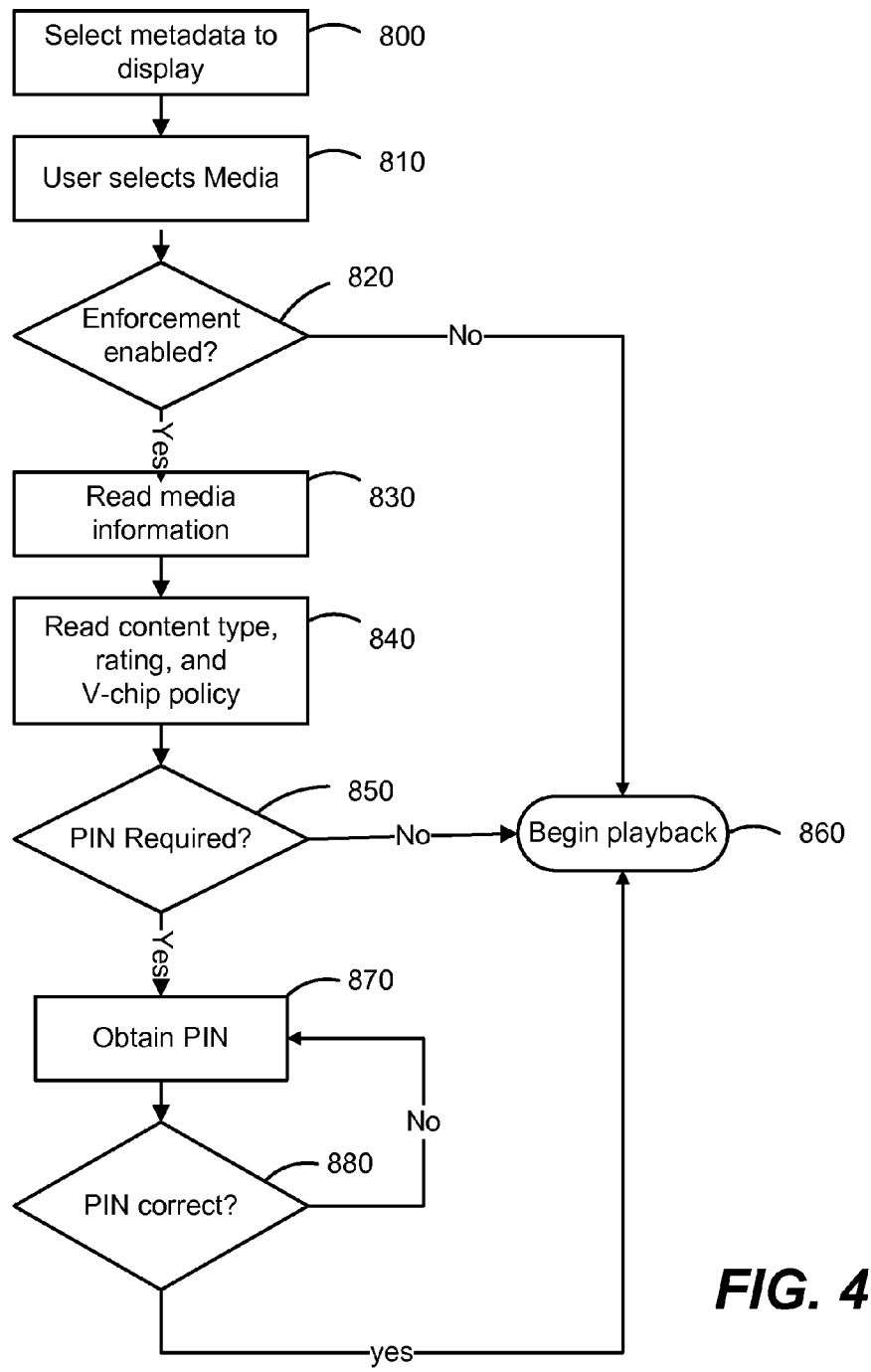
FIG. 4 illustrates one example embodiment of a process for policy enforcement.

FIG. 4 illustrates rating policy enforcement in operation. The process begins at step 800 when metadata 330 is selected for display. Metadata 330 is displayed according to the rating actions 520. If the metadata setting is set to be hidden, the metadata 330 is not displayed to the user. This setting will prevent content 320 from being selected for playback by subsequent steps in the process. If metadata 330 can be displayed, it is displayed.

The process continues at step 810 when the user selects the content 320 from the metadata 330 displayed for playback.

Once selected, the process determines if the enforcement enabled switch 510 is set in step 820. If not set, the process terminates and content playback begins 860.

If the enforcement enabled switch 510 is set, the content information, including the content rating is read 830. The content rating may be stored within the content (file or stream) itself or within a separate metadata (file or files, stream or streams). The process continues in step 840 by reading the V-chip policy for the appropriate content type and the content rating.

The process continues at step 850 determining if a PIN is required to play the content 320. This sub-process is further described with reference to FIG. 5. If no PIN is required, the process terminates and media playback begins 860. If a PIN is required, the process continues with step 870 to obtain the PIN. Once obtained, the PIN is compared against the admin PIN 430 and the user identity 410 that are referenced in the user actions 530. If the PIN comparison 880 is incorrect, the process returns to step 870 to request the PIN again. If the PIN is correct, the process completes at step 880 and content playback begins.

Figure 5:
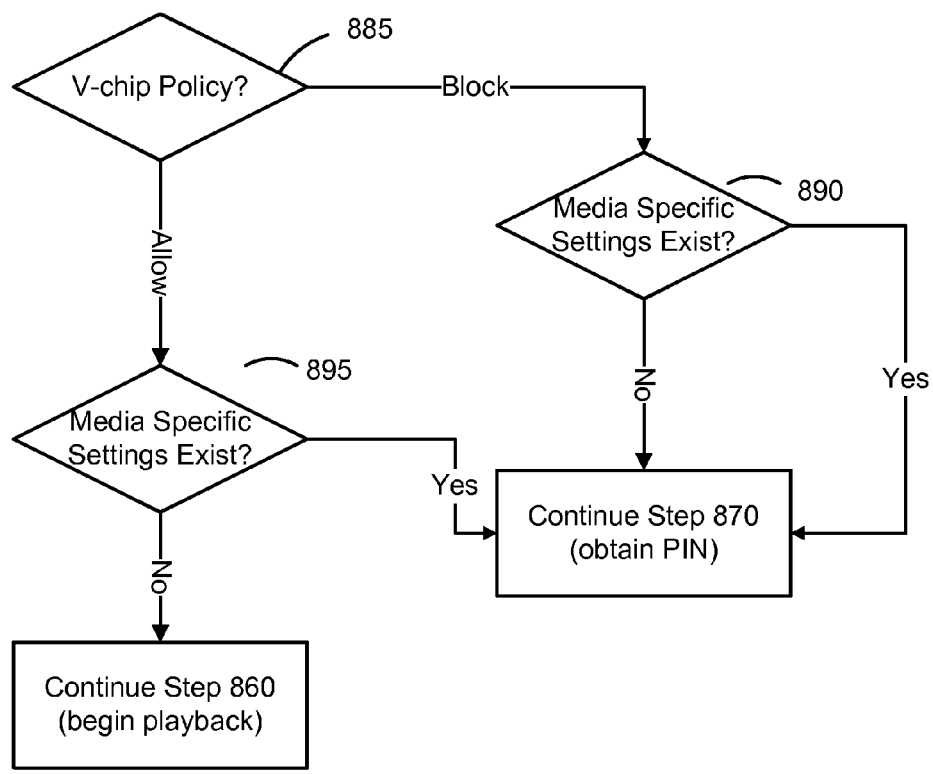
FIG. 5 illustrates one example embodiment of a process for determining if a PIN is required.

FIG. 5 describes the detail sub-process for determining if a PIN is required using multiple policies. The process begins in step 885 by determining the V-chip policy. If the V-Chip policy is allow, step 895 determines if any rating actions 520 exist. If no rating actions 520 for the content 320 exist, then no PIN is required and the sub-process terminates and the main process continues at step 860 by beginning content playback using the media player application 200.

If the V-chip policy is block at step 885, rating actions 520 are read in step 890. In either case, whether rating actions 520 exist or not, a PIN is required to view the program. If no rating actions 520 are configured, then the admin PIN 430 is required. In the case of rating actions 520, multiple PINs (user actions 530 and group actions 540) may allow the content to be viewed. The list of PINs that need to be supplied to view the content are determined by reading the content identifier stored within the rating action 520. This content identifier matches the content identifier stored within the user action 530. Using the user identifier stored within the user action, the correct user PIN can be found from within the user identity 410. When a group action is configured, the content identifier matches the content identifier stored within the group action 540. This group identifier matches the group identifier stored in group associations 420. Then the user identifiers stored within the group association match the user identifiers stored within user identity 410. The process continues in main process step 870 by obtaining a pin.

The sub-process illustrated in FIG. 5 may be cancelled at any time, and if so, media playback does not begin. For playback devices not using the V-chip, the existing polices and mechanisms used to block content can be augmented using these same methods.

The policy enforcement system may be implemented such that a user must enter a PIN prior to operating the playback device after the playback device has been powered on. By authenticating once, PIN entry is not required for those programs where the user's PIN is sufficient. This allows the user access to all relevant content based on the data stored in the policy database until the device is powered off, a timeout occurs, or the user explicitly releases the authentication. This process is achieved by modifying the policy enforcement process (see FIG. 4) moving the process block defined by steps 870 and 880 to the beginning of the process in order to obtain the PIN once per session. When a PIN is required by step 850, the PIN is supplied at the beginning of the modified process. This process modification method may allow a more enjoyable user experience in that entering PIN information repeatedly is minimized.

This process modification also provides a method to control metadata viewing. Authenticating the user and obtaining the PIN prior to metadata display, allows metadata to be filtered according to the rating policy database 500 configuration.

Ratings Policy Review and Modification

Once stored, actions (rating actions 520, user actions 530, and group actions 540) can be reviewed, modified, enabled, disabled, or deleted. In all cases, the admin PIN is required for access to the policy information. If the V-chip policy is disabled, the defined processes operate as the default policy allows. Although not described in detail, review or modification of existing policies requires reading the policies from the rating policy database 300 and presenting a user interface for review, modification, enabling, disabling, or deleting. The rating policy review and modification process is a modification of the process described in FIG. 3. The process is modified by initiating the process to display the policies stored in the rating policy database 500, instead of using content 300. Step 750 is modified to display the rating policy database 500 and provide selection of a rating action 520, user action 530, or group action 540. Step 760 is modified to change the selected action. Step 780 is modified to update the existing action with the new information.

Exporting Ratings Policies to Other Playback Devices

When the rating policy database 500 or authentication database 400 is stored on a device that can be remotely accessed (such as through a network interface device 120), rating policies can be shared amongst different media player applications 200. For example, for any household with multiple playback devices 1000, a single rating policy database 500 can be shared. Sharing databases eliminates the need to manually perform the same configuration and updates on individual playback devices 1000.

For devices that cannot share rating policy database 500 or authentication database 400, the databases can be exported from one playback device 1000 and imported into another playback device 1000 using either the external storage interface 107 and connecting an external storage device (USB flash, hard disk drive, SD card, or other storage media). The admin PIN is required to export and import the databases. Exporting data is encrypted using industry standard encryption algorithms deriving the encryption key from the admin PIN. Exported data is also authenticated using industry standard hash algorithms such that the data integrity can be determined prior to importing into the second playback device 1000.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate or distributed components. These and other variations, modifications, additions, and improvements fall within the scope of the subject matter herein.

Certain embodiments are described herein as including logic or a number of components, modules, or mechanisms.

Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example processes described herein, e.g., as described with FIGS. 3, 4 and 5, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 61/478,204, entitled "ACCESS CONTROLS FOR KNOWN CONTENT," filed Apr. 22, 2011, is incorporated herein by reference, in its entirety.

From the foregoing it will be appreciated that, although specific embodiments have been described herein for purposes of illustration, various modifications and variations, may be made in the arrangement, operation and details of the method and apparatus disclosed herein without deviating from the spirit and scope defined in the following claims. For example, still additional alternative structural and functional designs for a system and a process for provisioning and using a virtual Secure Digital card through the disclosed principles herein are contemplated through the disclosed principles herein. The methods and systems discussed herein also are applicable to other architectures, differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. An apparatus for setting rating based access controls for known digital content to be played on a video playback device having a V-chip, the apparatus comprising: a rating policy management module for selectively setting rating based access control on a per media and per user basis for digital content of a digital library thereby overriding a policy set by the V-chip for access to the digital content from the video playback device; and a rating policy enforcement module for enforcing rating based access to the individual digital content for a plurality of users separate from and in addition to an administrator, wherein at least a first user and a second user of the plurality of users have different media rating requirements and have different media ratings associated with a same specific digital content, wherein a first of the two users is allowed to access the specific digital content based upon a first authentication code and a second of the two users is blocked from access to the specific digital content based upon a second authentication code, wherein the first authentication code comprises a personal identification number (PIN), wherein the different ratings associated with the specific digital content are enforced using the first and second authentication codes, and wherein the first of the two users is allowed to access the specific digital content in response to determining that a content identifier of the specific digital content matches a user identifier of the first user and the personal identification number of the first user is successfully authenticated.

2. The apparatus of claim 1, further comprising a rating policy database for storing rating based access controls for digital content of the digital library.

3. The apparatus of claim 2, further comprising a data port for exporting the policy database to another playback device.

4. A method in a computing system for creating specific rating policies for digital media access, the method comprising: under control of the computing system having a memory and a processor, performing the acts of: retrieving media information from the memory comprising a rating based media access policy for a digital content; displaying the rating based media access policy to a user; receiving from the user a first rating based access control policy override action for a first viewer and a second, different, rating based access control policy override action for a second viewer with respect to a same specific digital content, wherein the first viewer and second viewer are separate and distinct from the user from which the override actions are received, and wherein the first viewer is associated with a first authentication code unique to the first viewer and the second viewer is associated with a second authentication code unique to the second viewer; storing the first and second policy override actions in a rating policy repository wherein future playback of the digital content is allowed or blocked consistent with the stored policy override action, and wherein the first viewer is allowed to access the specific digital content based upon the first authentication code and the second viewer is blocked from access to the specific digital content based upon the second authentication code, wherein the first authentication code comprises a personal identification number (PIN), and wherein the first of the two users is allowed to access the specific digital content in response to determining that a content identifier of the specific digital content matches a user identifier of the first user and the personal identification number of the first user is successfully authenticated.

5. The method of claim 4 further comprising validating the authentication codes of the first viewer and the second viewer.

6. The method of claim 4, wherein the first and second authentication codes comprise a personal identification number (PIN).

7. The method of claim 5, wherein the authentication codes comprise biometric information.

8. The method of claim 4, further comprising displaying the media information, wherein the media information comprises a media rating.

9. The method of claim 4, further comprising displaying the media information, wherein the media information comprises a media owner.

10. The method of claim 4, wherein the first policy override action comprises modifying media access for the first viewer and the second policy override action comprises modifying media access for the second viewer.

11. The method of claim 4, wherein the first policy override action comprises modifying media access for a group that includes the first viewer.

12. A method in a computing system for rating based media access policy enforcement, the method comprising: under control of a video playback device having a V-chip that specifies default rating based access policy, performing the acts of: displaying metadata; responsive to a first user selecting a media content from the displayed metadata, and responsive to determining that rating based access control configured to override the V-chip default rating based access policy is enabled: reading media information; reading a default rating based access policy action associated with the selected media content configured to override the V-chip default rating based access policy; and responsive to determining that an authentication code is required: validating an authentication code; and beginning playback of the media; and responsive to a second different user selecting the same media from the displayed metadata: determining that an authentication code associated with the second preventing playback of the media wherein the first and second users are not administrators of the rating based access control configured to override the V-Chip default rating based access policy, wherein the first authentication code comprises a personal identification number (PIN), and wherein the first of the two users is allowed to access the media content in response to determining that a content identifier of the media content matches a user identifier of the first user and the personal identification number of the first user is successfully authenticated.

13. The method of claim 12, wherein the authentication codes comprise personal identification numbers.

14. The method of claim 12, wherein the authentication codes comprise biometric information.

15. The method of claim 12, wherein the default rating based access policy action is to deny access.

16. The method of claim 12, wherein the media information comprises a rating.

17. The method of claim 12, wherein the media information comprises a genre.

18. The method of claim 12, wherein the media information comprises a media owner.

19. The method of claim 12, further comprising retaining the associated authentication code of each user during a session associated with each user.

* * * * *